(12) United States Patent
Kang (10) Patent No.: US 8,113,437 B2
(45) Date of Patent: Feb. 14, 2012

(54) RFID DEVICE WITH MEMORY UNIT HAVING MEMRISTOR CHARACTERISTICS

(75) Inventor: Hee Bok Kang, Cheongju (KR)

(73) Assignee: Hynix Semiconductor, Inc., Icheon (KR)

( * ) Notice: Subject to any disclaimer, the term of this patent is extended or adjusted under 35 U.S.C. 154(b) by 0 days.

(21) Appl. No.: 12/792,437

(22) Filed: Jun. 2, 2010

(65) Prior Publication Data
US 2011/0147464 A1    Jun. 23, 2011

(30) Foreign Application Priority Data
Dec. 23, 2009   (KR) .................. 10-2009-0129390

(51) Int. Cl.
*G06K 19/06* (2006.01)
(52) U.S. Cl. .................. 235/492; 235/487; 257/5
(58) Field of Classification Search .............. 235/487, 235/492; 340/10, 572
See application file for complete search history.

(56) References Cited

U.S. PATENT DOCUMENTS

| 2004/0136255 A1* | 7/2004  | Crain et al. ............ 365/208 |
| 2007/0252185 A1* | 11/2007 | Kang ..................... 257/295 |
| 2010/0027319 A1* | 2/2010  | Noshiro ................. 365/148 |

FOREIGN PATENT DOCUMENTS

| KR | 1020090026632 A | 3/2009 |
| KR | 1020090037766 A | 4/2009 |

* cited by examiner

*Primary Examiner* — Daniel Hess
*Assistant Examiner* — Matthew Mikels (57) ABSTRACT

An RFID device may ensure a stable sensing margin by employing a ReRAM. In an embodiment the RFID includes: a radio signal transceiver configured to transmit/receive a radio signal to/from an external reader; a digital unit configured to detect a command signal from an output of the radio signal transceiver and output a control signal corresponding to the command signal; and a memory unit configured to perform a read or write operation in response to the control signal, the memory unit including a resistive switch device (RSD) having memristor characteristics.

18 Claims, 11 Drawing Sheets

Fig.11

RFID DEVICE WITH MEMORY UNIT HAVING MEMRISTOR CHARACTERISTICS

CROSS-REFERENCE TO RELATED APPLICATION

The priority based on Korean patent application No. 10-2009-129390, filed on Dec. 23, 2009, the disclosure of which is hereby incorporated in its entirety by reference, is claimed.

BACKGROUND OF THE INVENTION

Embodiments in accordance with the present invention relate to a radio frequency identification (RFID) device, and more particularly, to a cell array technology of a resistive random access memory (ReRAM) device using a resistive switch device (RSD).

In general, a ReRAM is a nonvolatile memory device which stores data by changing an electrical resistance of a material by applying an external voltage to a thin film.

Figure 1:
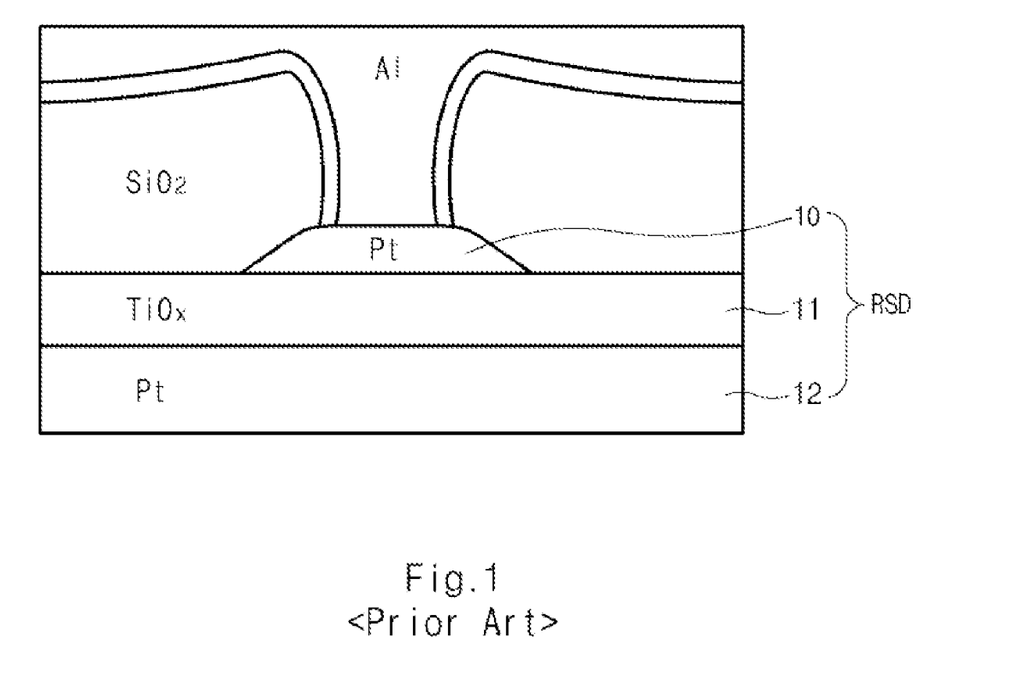
FIGS. 1 and 2 are diagrams illustrating a conventional RSD.
Figure 2:
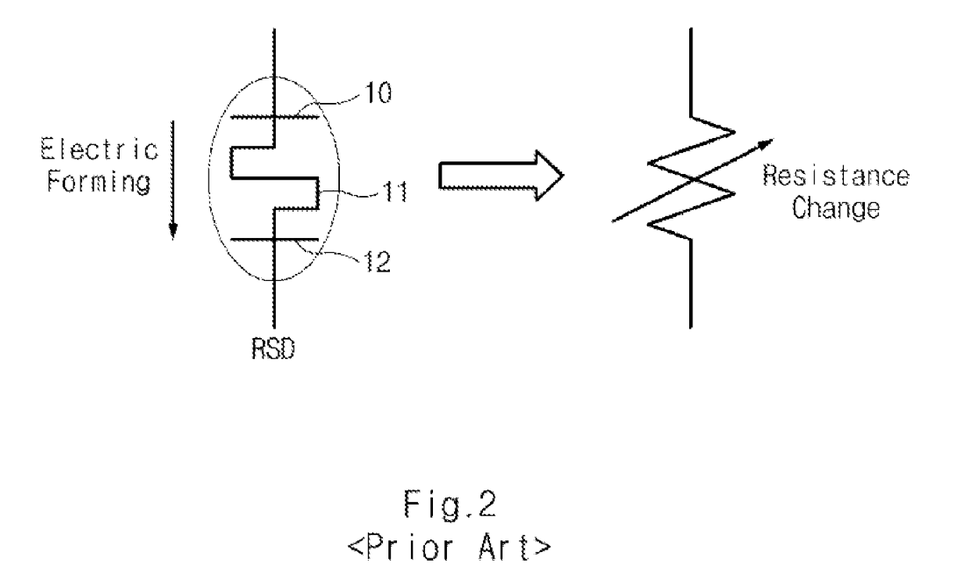

FIGS. 1 and 2 are diagrams showing the cross-sectional structure and operation principle of an RSD in a conventional ReRAM.

The RSD has a structure in which a resistive switch 11 is disposed between a top electrode 10 and a bottom electrode 12. The top electrode 10 and the bottom electrode 12 are formed of a metal such as platinum Pt, and the resistive switch 11 is formed of a resistive insulation layer such as $TiO_x$.

Research into the ReRAM having the above-described configuration has been conducted since the 1960's. In general, the ReRAM (memristor) has a metal insulator metal (MIM) structure using a transition metal oxide. Accordingly, when an appropriate electric signal is applied to the ReRAM, the memory characteristic of the ReRAM changes from a high-resistance non-conductive state (off state) to a low-resistance conductive state (on state).

The ReRAM may be classified into a current-controlled negative differential resistance (CNDR) device and a voltage-controlled negative differential resistance (VNDR) device, depending on the electrical method for embodying on/off characteristics.

Materials exhibiting ReRAM (memristor) characteristics may be categorized as follows.

A first category comprises materials such as colossal magneto-resistance (CMR) and $Pr_{1-x}CaMnO_3$ (PCMO). These materials may be inserted between electrodes and a resistance change caused by an electric field can be used to store data.

A second category comprises binary oxides such as $Nb_2O_5$, $TiO_2$, NiO and $Al_2O_3$. These materials can be prepared to have a non-stoichiometric composition and used as a resistance controlled material.

A third category comprises chalcogenide materials. These materials change states (i.e., crystalline or amorphous) by flowing a high current like in the case of a phase change random access memory (PRAM), and a resistance difference caused by a change in a threshold voltage of an ovonic switch can be used.

A fourth category comprises chromium (Cr) or niobium (Nb) doped into materials such as $SrTiO_3$ and $SrZrO_3$. The doping can change the resistance state of these materials.

Finally, silver (Ag) (or the like having a high ion mobility) may be doped into a solid electrolyte such as GeSe. This material can then be manufactured into a programmable metallization cell (PMC) having two resistance states. The state depends on whether a conductive channel is formed within a medium by an electrochemical reaction.

In addition, materials having memory characteristics through the implementation of two stable resistance states or process methods thereof have been reported.

BRIEF SUMMARY OF THE INVENTION

Various embodiments of the present invention are directed to providing an RFID device which includes a ReRAM using an RSD and thus can ensure a stable sensing margin and improve the reliability of the RFID device.

In an embodiment of the present invention, an RFID device includes: a radio signal transceiver configured to transmit/receive a radio signal to/from an external reader; a digital unit configured to detect a command signal from an output of the radio signal transceiver and output a control signal corresponding to the command signal; and a memory unit configured to perform a data read or write operation in response to the control signal, the memory unit including a resistive switch device (RSD) having memristor characteristics.

DESCRIPTION OF EMBODIMENTS

Description will now be made in detail in reference to the embodiments of the present invention and accompanying drawings. Wherever possible, the same reference numbers will be used throughout the drawings to refer to the same or like elements.

Figure 3:
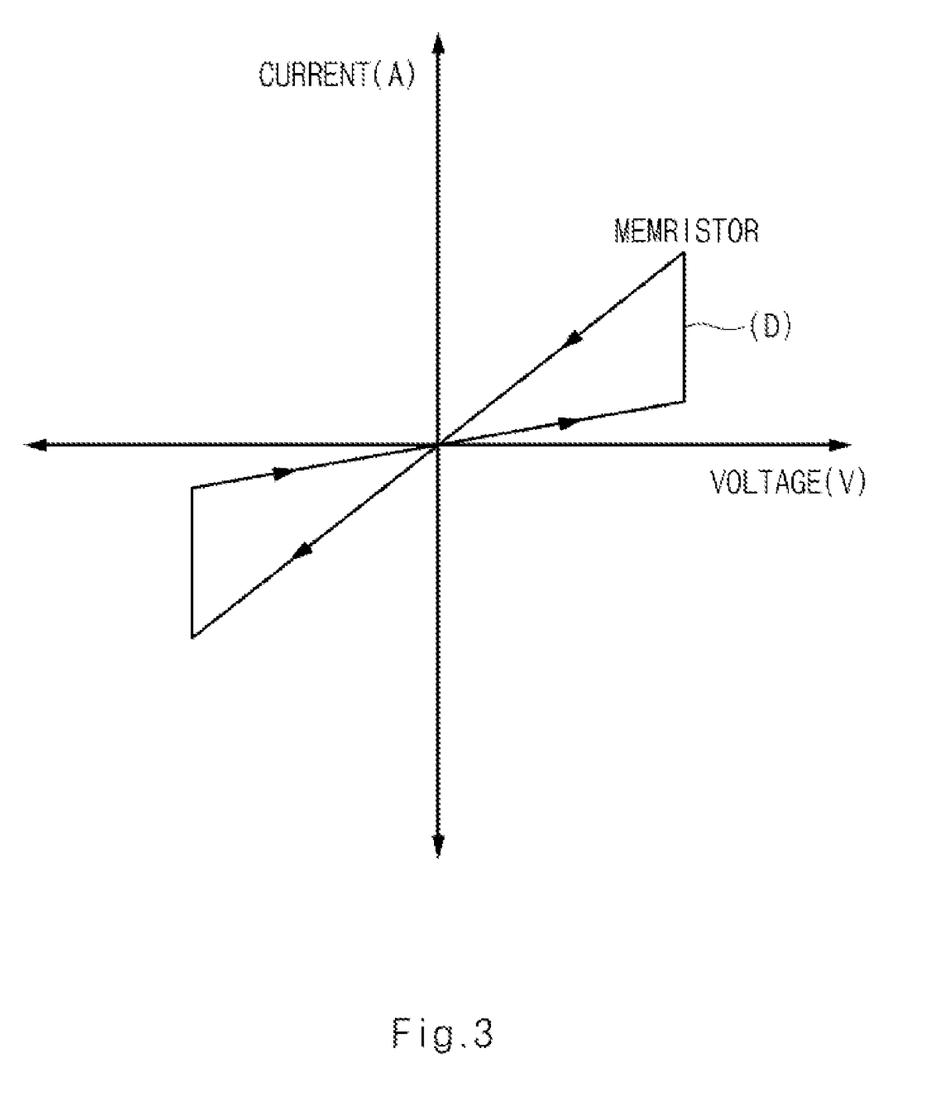
FIG. 3 is a diagram illustrating memristor characteristics.

FIG. 3 is a diagram illustrating memristor characteristics.

The memristor which is called a fourth electronic circuit element, along with a resistor, a capacitor, and an inductor, is the abbreviation for a memory resistor or a resistive memory.

The most significant difference of the memristor from other circuit elements is that the memristor can store information in a nonvolatile manner. That is, the memristor has a characteristic in which a resistance value is changed depending on a threshold current flow and the changed resistance value is retained.

A ReRAM has a structure in which a first electrode, a transition metal oxide layer, and a second electrode are sequentially stacked.

Accordingly, as a voltage increases in a positive direction, a current increases with a constant shallow slope (i.e., high resistance). When the voltage exceeds a threshold voltage, the current rapidly increases, as indicated by reference symbol D.

Then, as the voltage decreases in a negative direction, the current decreases with a constant steep slope (i.e., low resistance). When the voltage is less than a second threshold voltage, the current rapidly increases. Thereafter, as the voltage increases, the current increases with a constant shallow slope (i.e., back to the high resistance).

As such, the ReRAM has memristor characteristics derived from the transition metal oxide layer, that is, the ReRAM repeats the characteristic after which the current is rapidly increased or decreased depending on the voltage.

Figure 4:
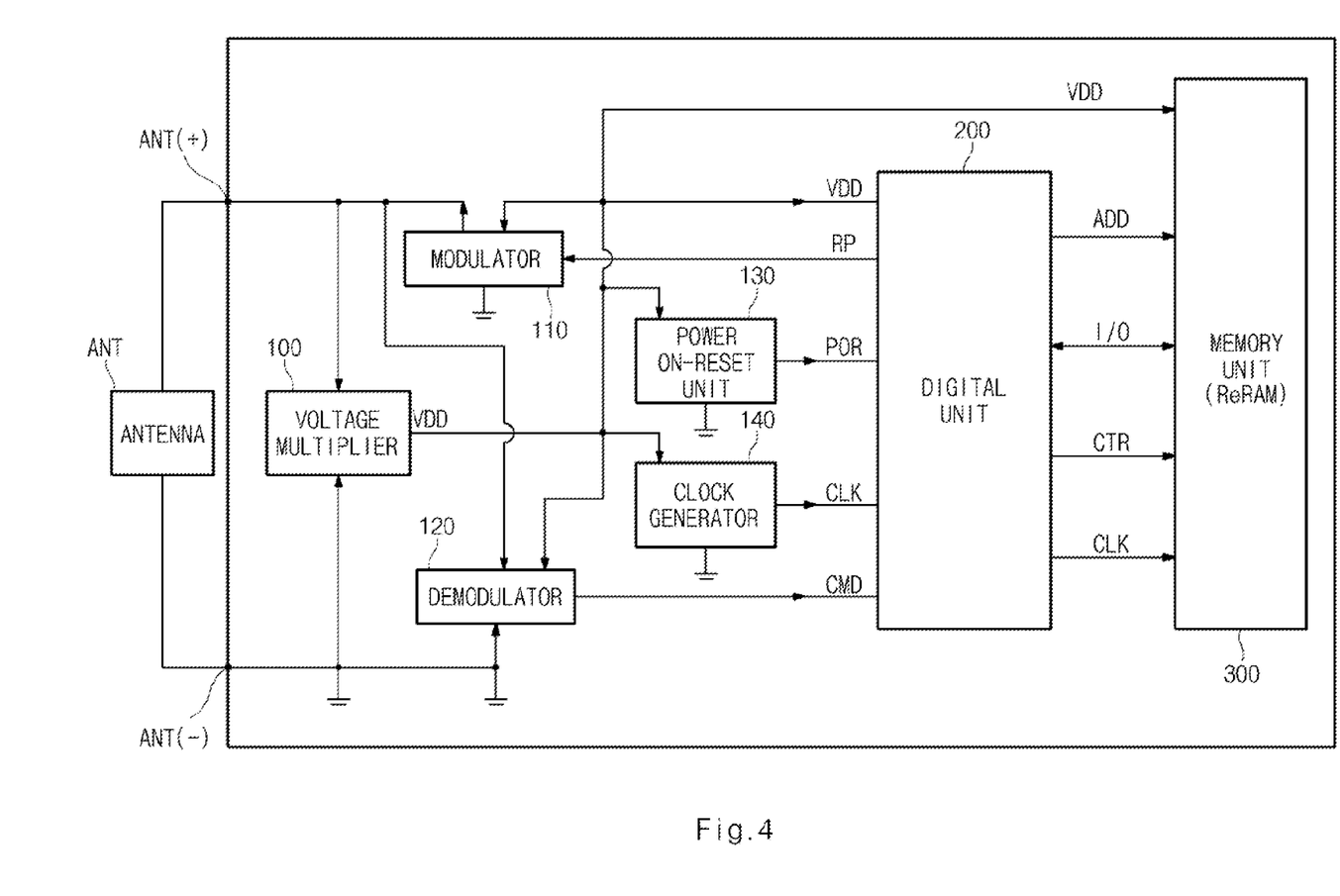
FIG. 4 is a configuration diagram illustrating an RFID device according to an embodiment of the invention.

FIG. 4 is a detailed configuration diagram illustrating an RFID device according to an embodiment of the invention.

The RFID device according to the embodiment of the invention includes a voltage multiplier 100, a modulator 110, a demodulator 120, a power on reset unit 130, a clock generator 140, a digital unit 200, and a memory unit 300. The voltage multiplier 100, the modulator 110, the demodulator 120, the power on reset unit 130, and the clock generator 140 correspond to a radio signal transceiver which transmits/receives a radio (RF) signal to/from an external reader.

An antenna ANT is configured to transmit/receive data between an external reader or writer and the RFID device. The antenna ANT is coupled to an RFID tag chip through antenna pads ANT(+) and ANT(−).

The voltage multiplier 100 generates a power supply voltage VDD as a driving voltage of the RFID device, based on the RF signal applied from the antenna ANT.

In addition, the modulator 110 modulates a response signal RP applied from the digital unit 200 and transmits the modulated response signal to the antenna ANT. The demodulator 120 detects an operation command signal from the RF signal applied from the antenna ANT, depending on an output voltage of the voltage multiplier 100, and outputs a command signal CMD to the digital unit 200.

The power on reset unit 130 detects the output voltage VDD of the voltage multiplier 100 and outputs a power on reset signal POR for controlling a reset operation to the digital unit 200. The clock generator 140 supplies the digital unit 200 with a clock CLK for controlling an operation of the digital unit 200, depending on the output voltage VDD of the voltage multiplier 100.

Furthermore, the above-described digital unit 200 receives the power supply voltage VDD, the power on reset signal POR, the clock CLK, and the command signal CMD. The digital unit 200 interprets the command signal CMD, generates a control signal and processing signals, and outputs a corresponding response signal RP to the modulator 110. In addition, the digital unit 200 outputs an address ADD, input/output data I/O, a control signal CTR, and a clock CLK to the memory unit 300.

The memory unit 300 includes a plurality of memory cells, each of which functions to read and write data to a storage element.

The memory unit 300 includes the ReRAM using the RSD. The ReRAM is a nonvolatile memory device which changes an electrical resistance of a material by applying an external voltage to a thin film and data is stored by using a difference of the electrical resistance.

Figure 5:
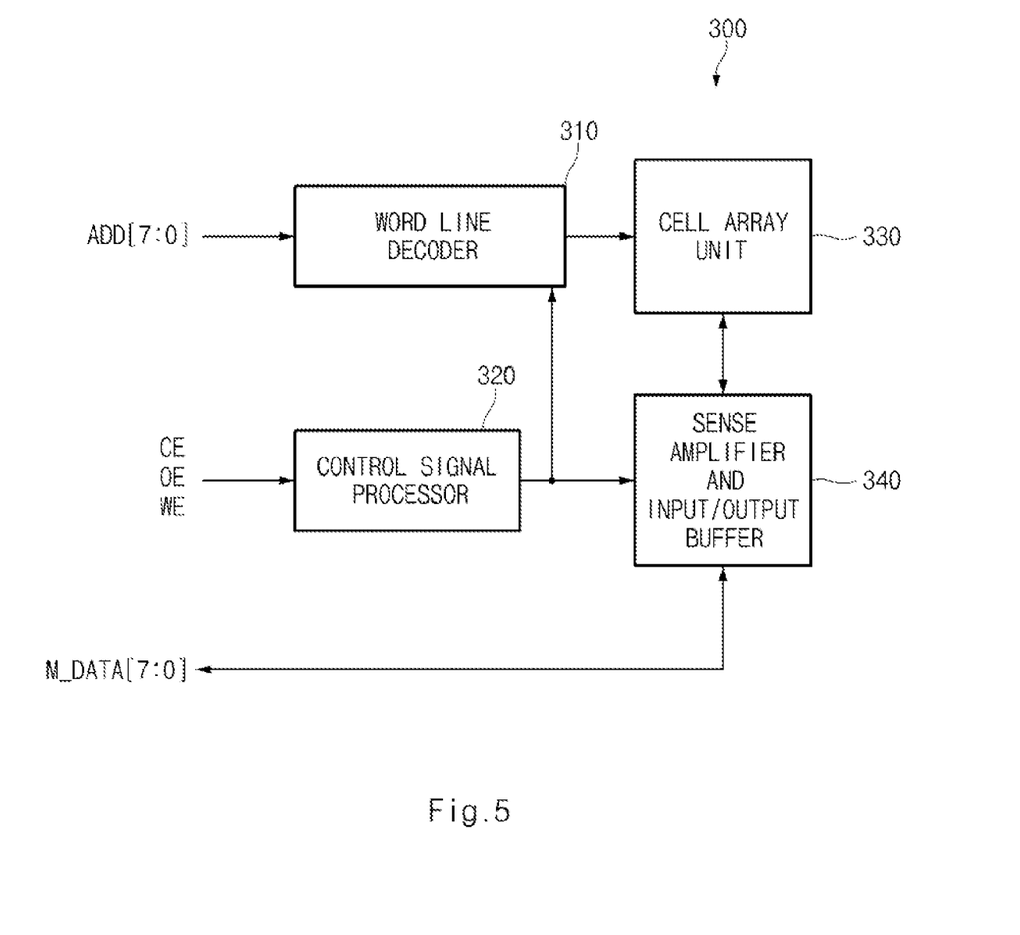
FIG. 5 is a detailed configuration diagram illustrating a memory unit of FIG. 4.

FIG. 5 is a detailed configuration diagram of an embodiment of the memory unit 300 of FIG. 4.

The memory unit 300 includes a word line decoder 310, a control signal processor 320, a cell array 330, and a sense amplifier and input/output buffer 340.

Specifically, the word line decoder 310 decodes an address ADD[7:0] applied from the digital unit 200 in order to select word lines WL, and outputs the decoded address to the cell array 330. The address ADD[7:0] represents an address applied from the memory unit 300.

The control signal processor 320 controls the word lines WL and cell plate lines CPL, which drive the cell array 330, in response to the control signal CTR, such as a chip enable signal CE, an output enable signal OE, and a write enable signal WE, which are applied from the digital unit 200.

Furthermore, the control signal processor 320 controls an operation of the sense amplifier and input/output buffer 340 in response to the control signal CTR (i.e., the chip enable signal CE, the output enable signal OE, and the write enable signal WE, which are applied from the digital unit 200).

That is, the control signal processor 320 outputs a sense amplifier enable signal, an output enable signal, and a write enable signal. The sense amplifier enable signal is for controlling whether to enable the sense amplifier 340. The output enable signal is for outputting data sensed by the sense amplifier 340 to a data bus M_DATA. The write enable signal is for writing the data applied from the data bus M_DATA to the cell array 330.

The cell array 330 includes the ReRAM using the RSD and therefore has the memristor characteristics. According to an embodiment of the invention, the device having the memristor characteristics is applied to the memory unit 300 including the ReRAM.

The cell array 330 includes the plurality of memory cells, and one of the plurality of memory cells is selected by the address outputted from the word line decoder 310. The cell array 330 includes a plurality of unit cells each having an RSD and a switching device, and stores or reads data in the RSD.

Furthermore, the operation of the sense amplifier and input/output buffer 340 is controlled in response to the sense amplifier enable signal, the output enable signal OE, and the write enable signal WE, which are applied from the control signal processor 320, based on a reference voltage.

The sense amplifier and input/output buffer 340 senses and amplifies data applied from the cell array 330, outputs the sensed and amplified data to the data bus M_DATA, and transfers the data applied from the data bus M_DATA to the cell array 330.

Table 1 below shows the function of control signals used in the memory unit 300 having the above-described configuration.

TABLE 1

| Control Signal | Input/Output | Description |
| --- | --- | --- |
| ADD | Input | Address applied from the digital unit |
| CE | Input | Chip enable signal applied from the digital unit |
| WE | Input | Write enable signal applied from the digital unit |
| OE | Input | Output enable signal applied from the digital unit |
| M_DATA | Input/output | Input/output data bus |

Figure 6:
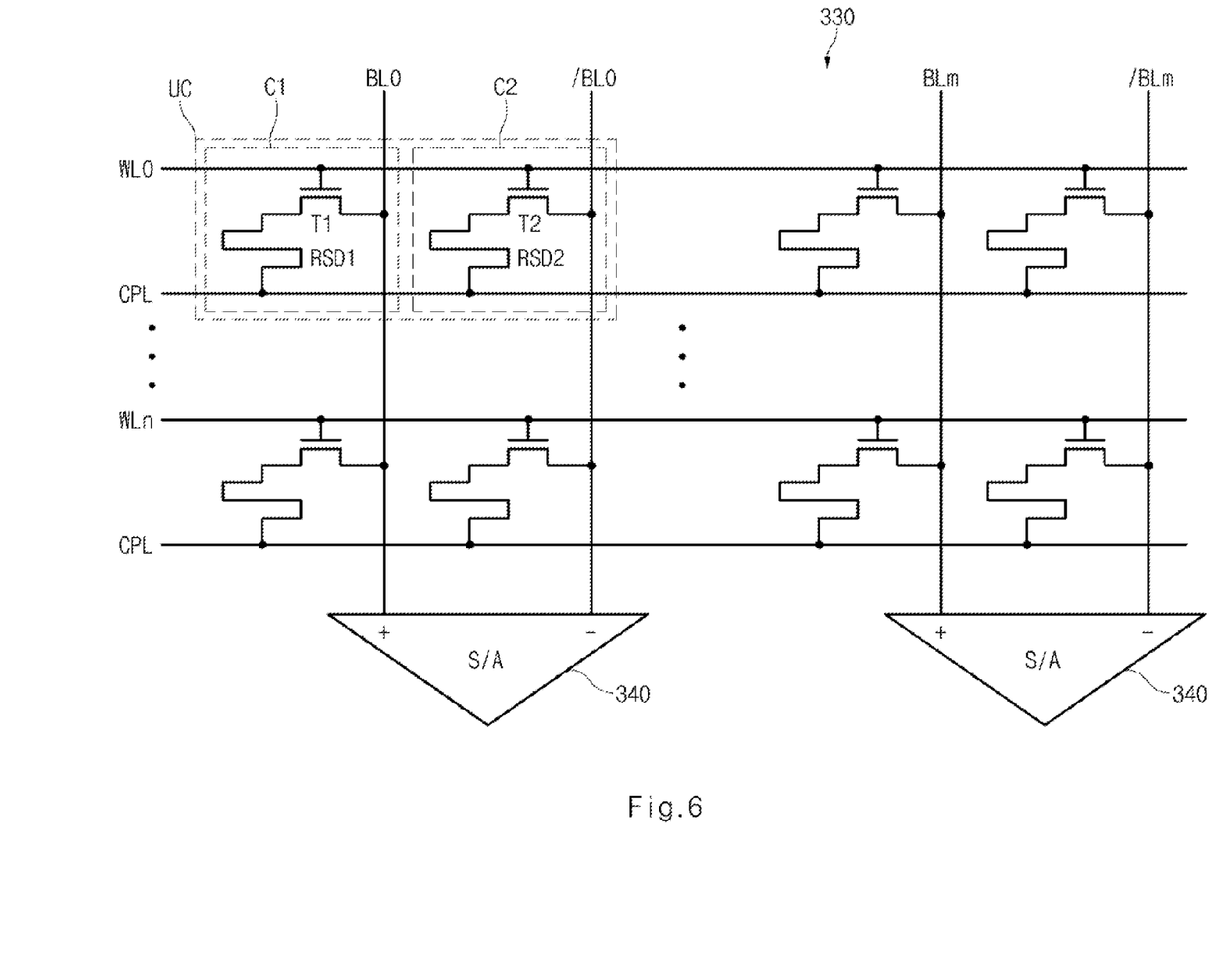
FIG. 6 is a detailed circuit diagram illustrating a cell array of FIG. 5.

FIG. 6 is a detailed circuit diagram illustrating the ReRAM having the memristor characteristics in the cell array 330 of FIG. 5.

Hereinafter, a case in which a unit cell UC of the ReRAM includes cells C1 and C2 having a two-transistor two-resistor (2T2R) structure will be described as an embodiment of the present invention with reference to FIG. 6. The cell C1 having a 1T1R structure is coupled to a bit line BL and stores 'positive' data, and the cell C2 having a 1T1R structure stores 'negative' data.

According to an embodiment of the invention, a plurality of word lines WL0 to WLn and a plurality of cell plate lines CPL are arranged in a row direction. The word lines WL0 to WLn are selected separately depending on the inputted address. The cell plate lines CPL receive a single common cell plate select address. A plurality of bit line pairs BL0 and /BL0 to BLm and /BLm are arranged in a column direction.

In addition, the unit cells UC are formed in regions where the word lines WL0 to WLn, the cell plate lines CPL, and the bit line pairs BL0 and /BL0 to BLm and /BLm are intersected.

Each of the unit cells UC includes the ReRAM having the 2T2R structure.

In the unit cell UC, the cell C1 includes a switching device T1 and a resistive switch device RSD1. The switching device T1 is coupled between the bit line BL0 and the resistive switch device RSD1, and a gate terminal of the switching device T1 is coupled to the word line WL0. The switching device T1 may include an NMOS transistor. The resistive switch device RSD1 is coupled between the switching device T1 and the cell plate line CPL.

In the unit cell UC, the cell C2 includes a switching device T2 and a resistive switch device RSD2. The switching device T2 is coupled between the bit line /BL0 and the resistive switch device RSD2, and a gate terminal of the switching device T2 is coupled to the word line WL0. The switching device T2 may include an NMOS transistor. The resistive switch device RSD2 is coupled between the switching device T2 and the cell plate line CPL.

Furthermore, the sense amplifier 340 is coupled to the bit line pair BL0 and /BL0, and senses and amplifies cell data applied from the unit cell UC. The single sense amplifier 340 is shared by the bit line pair BL0 and /BL0.

Figure 7:
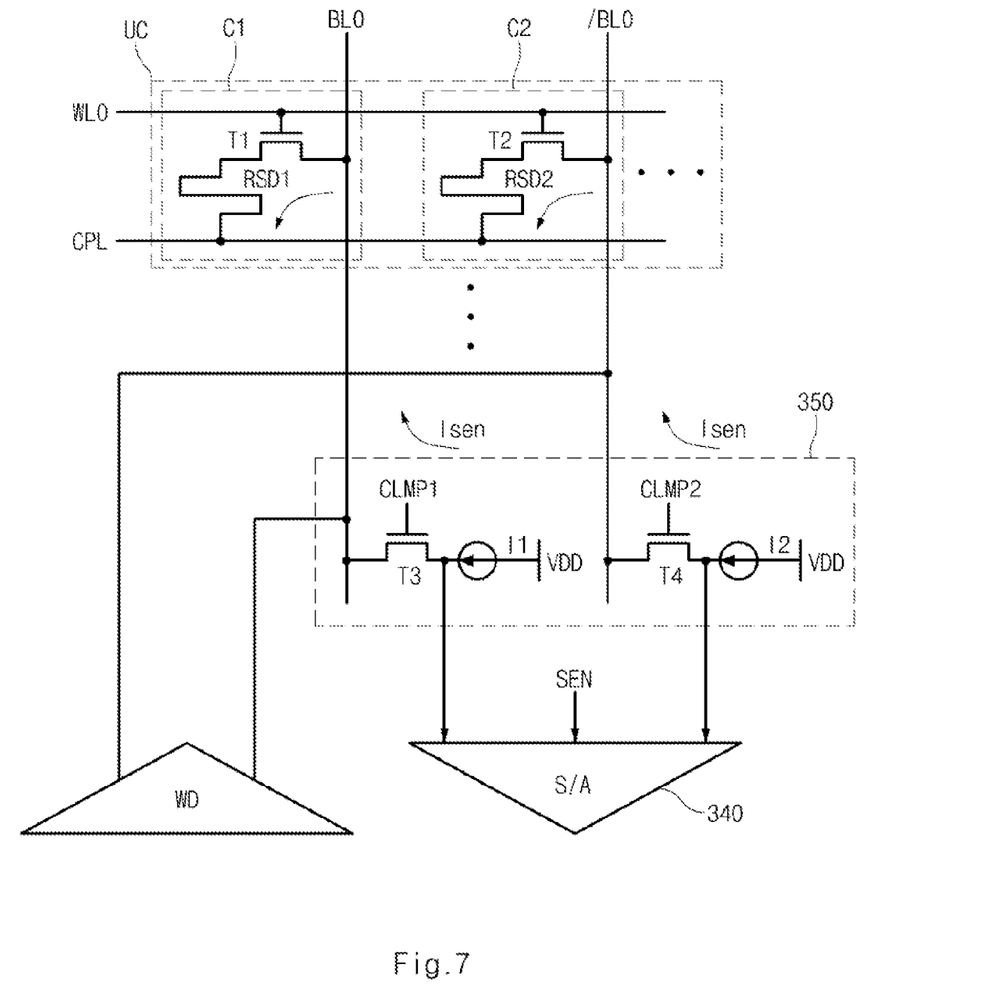
FIG. 7 is a detailed configuration diagram illustrating a write driver and a clamp controller coupled to the cell array of FIG. 6.

FIG. 7 is a configuration diagram illustrating the sense amplifier 340, a write driver WD, and a clamp controller 350 in the cell array 330 of FIG. 6.

The write driver WD is coupled to the bit line pair BL0 and /BL0, and supplies the bit line pair BL0 and /BL0 with a write voltage in a write operation mode.

The clamp controller 350 is coupled to the bit line pair BL0 and /BL0, and supplies the bit line pair BL0 and /BL0 with a constant bias voltage in a read operation mode.

The clamp controller 350 includes switching devices T3 and T4 and current sources I1 and I2. The switching device T3 is coupled between the bit line BL0 and the current source I1, and receive a clamp control signal CLMP1 through a gate terminal thereof. The current source I1 is coupled between a power supply voltage (VDD) terminal and the switching device T3.

The switching device T4 is coupled between the bit line /BL0 and the current source I2, and receives a clamp control signal CLMP2 through a gate terminal thereof. The current source I2 is coupled between the power supply voltage (VDD) terminal and the switching device T4.

In the clamp controller 350 having the above-described configuration, when the clamp signals CLMP1 and CLMP2 are activated to a high level in the read operation mode, the switching device T3 is turned on. Thus, the bias voltage is supplied to the bit line pair BL0 and /BL0 through the current sources I1 and I2. Accordingly, when a sense amplifier enable signal SEN is activated in the read operation mode, the sense amplifier 340 senses and amplifies a sensing current Isen flowing through the bit line pair BL0 and /BL0.

Figure 8:
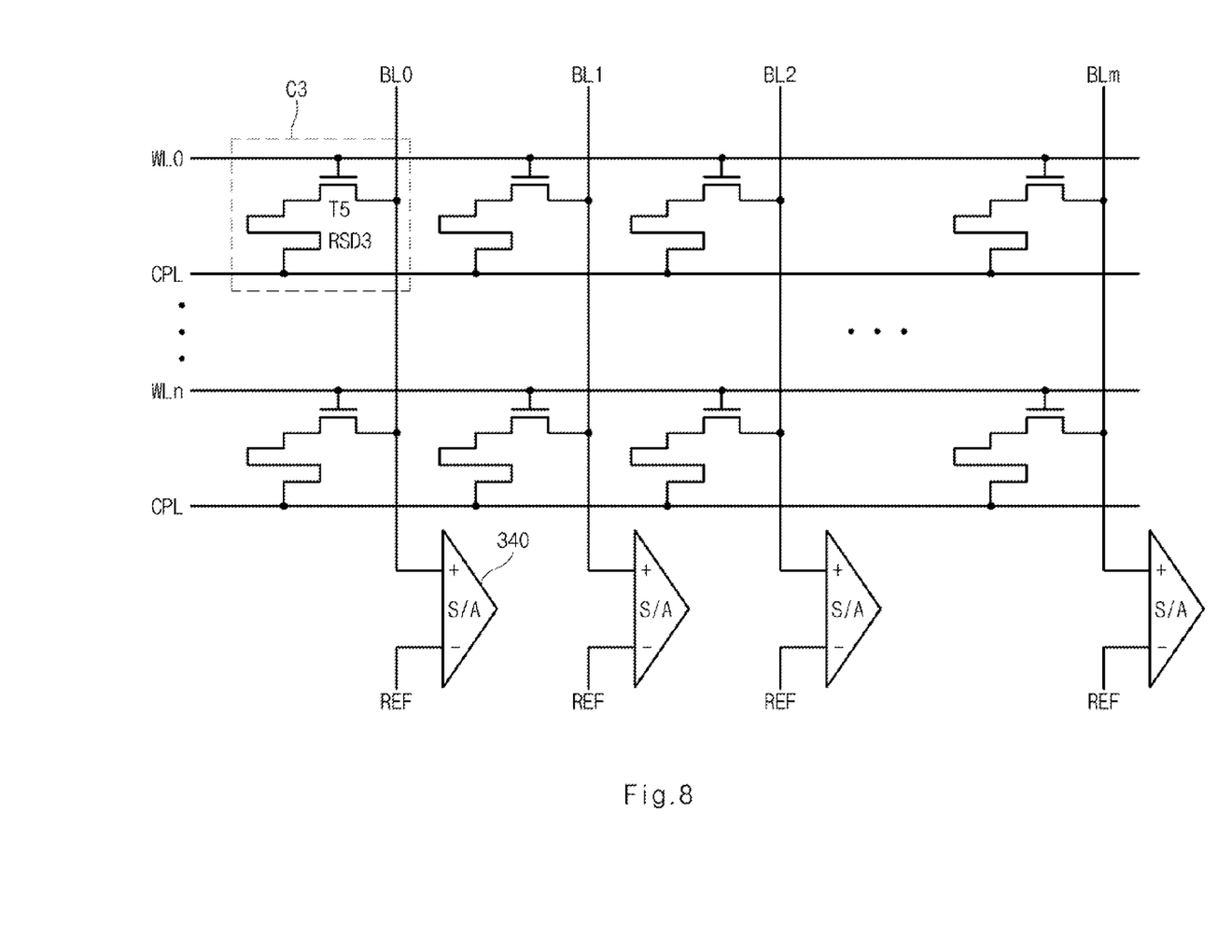
FIG. 8 is a configuration diagram illustrating a cell array of FIG. 5 according to another embodiment of the invention.

FIG. 8 is a configuration diagram illustrating the ReRAM having the memristor characteristics in the cell array 330 of FIG. 5 according to another embodiment of the invention.

Hereinafter, a case in which a unit cell UC of the ReRAM includes a cell C3 having a one-transistor one-resistor (1T1R) structure will be described as an embodiment of the present invention with reference to FIG. 8. The cell C3 having the 1T1R structure is coupled to the bit line BL and stores 'positive' data.

According to another embodiment of the invention, a plurality of word lines WL0 to WLn and a plurality of cell plate lines CPL are arranged in a row direction. The word lines WL0 to WLn are selected separately depending on the inputted address. The cell plate lines CPL receive a single common cell plate select address. A plurality of bit lines BL0 to BLm are arranged in a column direction.

In addition, the unit cells UC3 are formed in regions where the word lines WL0 to WLn, the cell plate lines CPL, and the bit line pairs BL0 and /BL0 to BLm and /BLm intersect.

Each of the cells C3 includes the ReRAM having the 1T1R structure.

The cell C3 includes a switching device T5 and a resistive switch device RSD3. The switching device T5 is coupled between the bit line BL0 and the resistive switch device RSD3, and a gate terminal of the switching device T5 is coupled to the word line WL0. The switching device T5 may include an NMOS transistor. The resistive switch device RSD3 is coupled between the switching device T5 and the cell plate line CPL.

Furthermore, the sense amplifiers 340 are coupled to the bit lines BL0 to /BLm, respectively, and sense and amplify cell data applied from the cells C3 through the bit lines BL0 to /BLm. The sense amplifiers 340 have positive (+) terminals coupled to the bit lines BL, and negative (−) terminals to which a reference voltage REF is applied.

Figure 9:
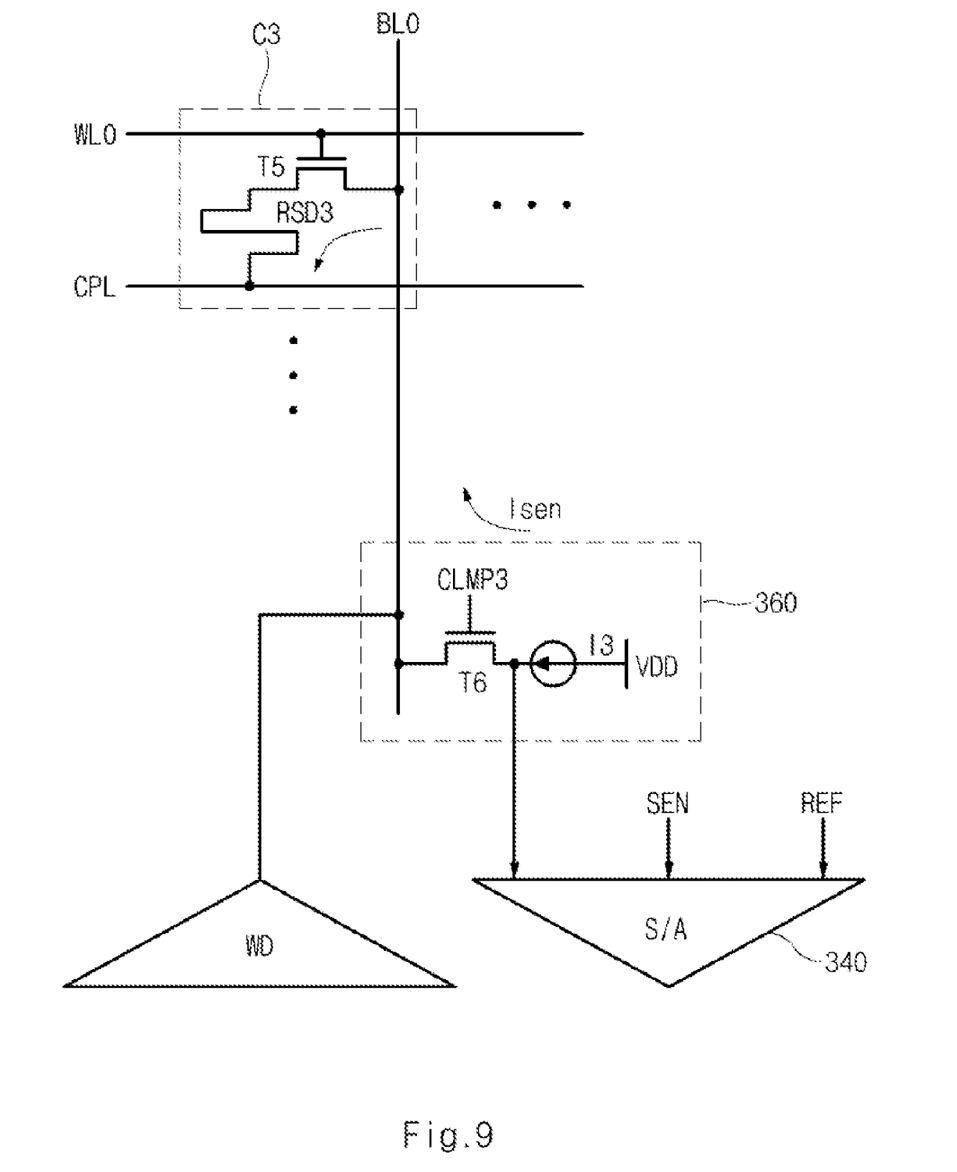
FIG. 9 is a detailed configuration diagram illustrating a write driver and a clamp controller coupled to the cell array of FIG. 6.

FIG. 9 is a configuration diagram illustrating the sense amplifier 340, a write driver WD, and a clamp controller 360 in the cell array 330 of FIG. 8.

The write driver WD is coupled to the bit line BL0, and supplies the bit line BL0 with a write voltage in a write operation mode.

The clamp controller 360 is coupled to the bit line BL0, and supplies the bit line BL0 with a constant bias voltage in a read operation mode.

The clamp controller 360 includes a switching device T6 and a current source I3. The switching device T6 is coupled between the bit line BL0 and the current source I3, and receives a clamp control signal CLMP3 through a gate terminal thereof. The current source I3 is coupled between a power supply voltage (VDD) terminal and the switching device T6.

In the clamp controller 360 having the above-described configuration, when the clamp signal CLMP3 is activated to a high level in the read operation mode, the switching device T6 is turned on. Thus, the bias voltage is supplied to the bit line BL0 through the current source I3.

Accordingly, when a sense amplifier enable signal SEN is activated in the read operation mode, the sense amplifier 340 senses and amplifies a sensing current Isen flowing through the bit line BL0. At this time, the sense amplifier 340 compares the reference voltage REF with a sensing voltage, which is applied through the bit line BL0, when the sense amplifier enable signal SEN is activated.

Figure 10:
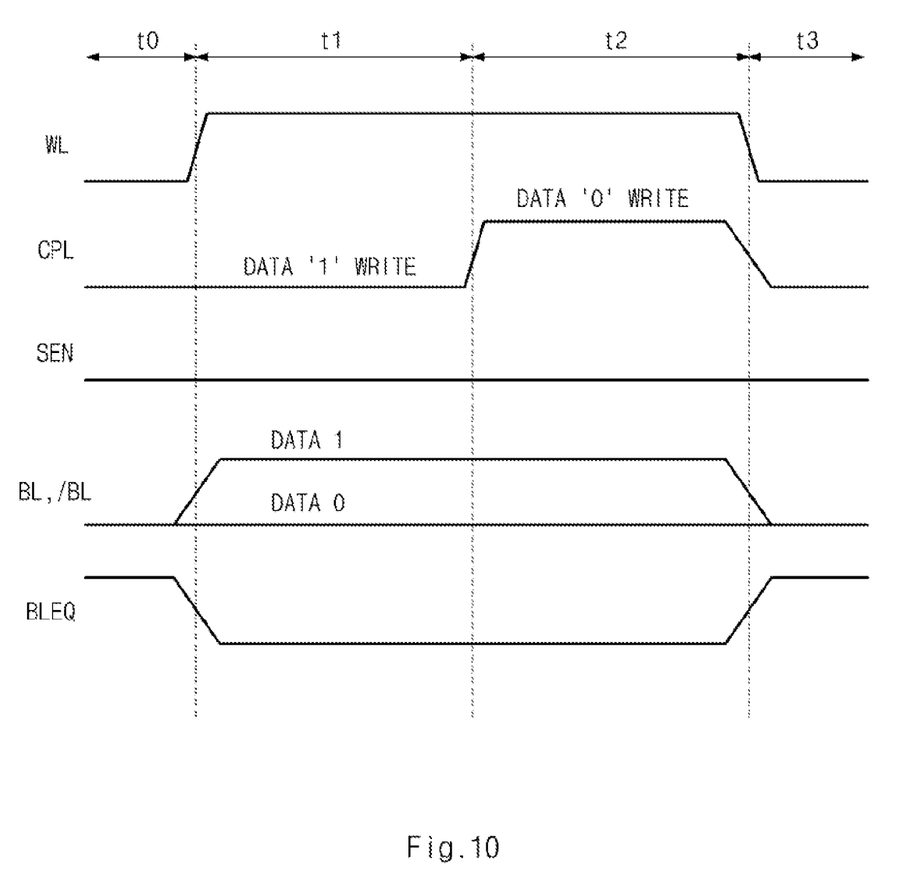
FIGS. 10 and 11 are timing diagrams showing example operation of the cell array of FIG. 5.

FIG. 10 is a timing diagram showing an example of a write operation of the cell array 330 having the above-described configuration. The embodiment in which the unit cell UC has the 2T2R structure will now be described with reference to FIG. 10. In FIG. 10, periods t1 and t2 correspond to a write enable period, and periods t0 and t3 correspond to a precharge period.

First, in the period t0, the word line WL, the cell plate line CPL, the sense amplifier enable signal SEN, and the bit line pair BL and /BL maintain a low level. Also, a bit line equalizing signal BLEQ is set to a high level, and the bit line pair BL and /BL maintains an equalized state.

In the period t1 which corresponds to a data '1' write period, the word line WL changes to a high level, and the bit line equalizing signal BLEQ changes to a low level.

In this case, since the switching devices T1 and T2 are turned on, the resistive switch device RSD1 is coupled to the bit line BL0, and the resistive switch device RSD2 is coupled to the bit line /BL0. Accordingly, a driving voltage applied from the write driver WD is applied to the resistive switch devices RSD1 and RSD2 through the bit line pair BL and /BL. At this time, the cell plate line CPL is still maintained at a low level.

In this case, when data of the bit line BL has a high level, a voltage is generated between the bit line BL and the cell plate line CPL. Thus, current flows from the bit line BL to the cell plate line CPL, so that the data '1' is written to the resistive switch device RSD1.

Next, in the period t2 which corresponds to a data '0' write period, the word line WL maintains a high level. Since the switching devices T1 and T2 are turned on, the resistive switch device RSD1 is coupled to the bit line BL0, and the resistive switch device RSD2 is coupled to the bit line /BL0. Accordingly, the driving voltage from the write driver WD is applied to the switching devices T1 and T2 through the bit line BL. At this time, the cell plate line CPL changes to a high level.

In this case, when the data of the bit line BL has a low level, a voltage is generated between the bit line BL and the cell plate line CPL. Thus, a current flows from the cell plate line CPL to the bit line BL, so that the data '0' is written to the resistive switch device RSD1.

Next, in the period t3, the word line WL, the cell plate line CPL, and the bit line pair BL and /BL change to a low level, and the sense amplifier enable signal SEN maintains a low level. Also, the bit line equalizing signal BLEQ changes to a high level, and the bit line pair BL and /BL maintains an equalized state.

Figure 11:
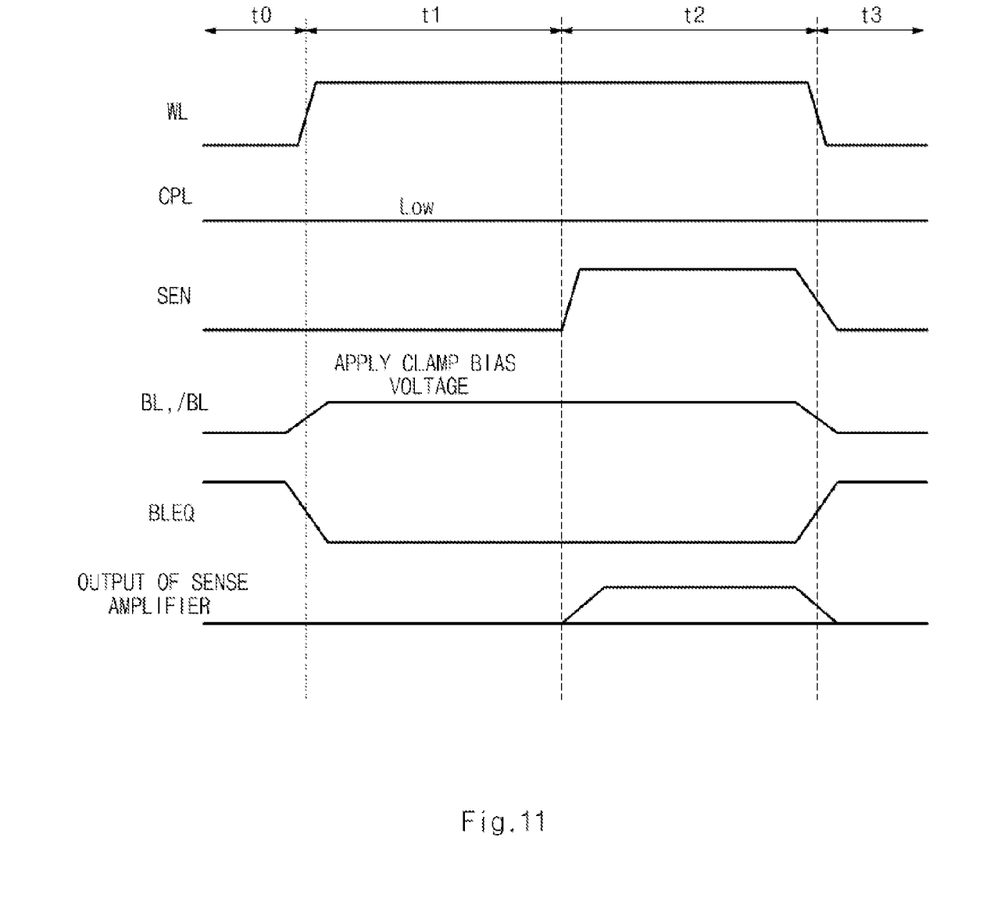

FIG. 11 is a timing diagram showing an example of a read operation of the cell array 330 having the above-described configuration. The embodiment in which the unit cell UC has the 2T2R structure will now be described with reference to FIG. 11. In FIG. 11, periods t1 and t2 correspond to a read enable period, and periods t0 and t3 correspond to a precharge period.

First, in the period t0, the word line WL, the cell plate line CPL, the sense amplifier enable signal SEN, the bit line pair BL and /BL, and the output of the sense amplifier 340 maintain a low level. Also, the bit line equalizing signal BLEQ is set to a high level, and the bit line pair BL and /BL maintains an equalized state.

Next, in the period t1 which corresponds to a data '1' read period, the word line WL changes to a high level, and the bit line equalizing signal BLEQ changes to a low level.

In this case, since the switching devices T1 and T2 are turned on, the resistive switch device RSD1 is coupled to the bit line BL0 and the resistive switch device RSD2 is coupled to the bit line /BL0. Accordingly, sensing voltages applied from the resistive switch devices RSD1 and RSD2 are applied to the sense amplifier 340 through the bit line pair BL and /BL. At this time, the cell plate line CPL is still maintained at a low level. A clamp bias voltage is applied to the bit line pair BL and /BL by the clamp controller 350.

Next, in the period t2, the sense amplifier enable signal SEN changes to a high level and the sense amplifier 340 is enabled to operate. At this time, the constant clamp bias voltage is applied to the bit line pair BL and /BL by the clamp controller 350. The cell plate line CPL is still maintained at a low level.

In this case, the sensing voltages applied from the resistive switch devices RSD1 and RSD2 are applied to the sense amplifier 340 through the bit line pair BL and /BL, and the sense amplifier 340 outputs high or low level data.

Next, in the period t3, the word line WL, the cell plate line CPL, and the bit line pair BL and /BL change to a low level, and the sense amplifier enable signal SEN maintains a low level. The bit line equalizing signal BLEQ changes to a high level, and the bit line pair BL and /BL maintains an equalized state.

According to certain embodiments of the present invention, the RFID device includes the ReRAM using the RSD and can ensure a stable sensing margin and improve reliability.

The above embodiments of the present invention are illustrative and not limitative. Various alternatives and equivalents are possible. Other additions, subtractions, or modifications are obvious in view of the present disclosure and are intended to fall within the scope of the appended claims.

What is claimed is:

1. A radio frequency identification (RFID) device comprising:
   a radio signal transceiver configured to transmit/receive a radio signal to/from an external reader;
   a digital unit configured to detect a command signal from an output of the radio signal transceiver and output a control signal corresponding to the command signal; and
   a memory unit that includes a resistive switch device (RSD) having memristor characteristics and that is configured to perform a data read or write operation in response to the control signal and to write data in the resistive switch device depending on a voltage difference between a bit line and a cell plate line, wherein the resistive switch device is coupled to the bit line and the cell plate line and a voltage level of the cell plate line changes according to a logic state of the data.

2. The RFID device of claim 1, wherein the memory unit comprises:
   a word line decoder configured to decode an address and control a word line;
   a control signal processor configured to receive the control signal and generate a signal for the data read or write operation;
   a cell array configured to perform the data read or write operation in response to an output of the word line decoder, the cell array including the resistive switch device; and
   a sense amplifier configured to sense and amplify an output of the cell array.

3. The RFID device of claim 1, wherein in the memory unit two cells each including the resistive switch device are coupled to a bit line pair to thereby form one unit cell.

4. The RFID device of claim 3, wherein the unit cell comprises:
   a first cell formed in a region where a first bit line of the bit line pair, a word line, and the cell plate line intersect; and
   a second cell formed in a region where a second bit line of the bit line pair, the word line, and the cell plate line intersect.

5. The RFID device of claim 4, wherein the first cell comprises:
   a first switching device coupled to the first bit line and controlled by the word line; and a first resistive switch device coupled to the first switching device and the cell plate line.

6. The RFID device of claim 4, wherein the second cell comprises:
a second switching device coupled to the second bit line and controlled by the word line; and
a second resistive switch device coupled between the second switching device and the cell plate line.

7. The RFID device of claim 3, wherein the bit line pair is shared by a single sense amplifier.

8. The RFID device of claim 3, wherein the memory unit comprises:
a first write driver configured to supply the bit line pair with a driving voltage in a write operation mode; and
a first clamp controller configured to supply the bit line pair with a constant bias voltage in a read operation mode.

9. The RFID device of claim 8, wherein the first clamp controller comprises:
a third switching device coupled to a first bit line of the bit line pair and controlled by a first clamp signal;
a first current source configured to supply the third switching device and a sense amplifier with the bias voltage;
a fourth switching device coupled to a second bit line of the bit line pair and controlled by a second clamp signal; and
a second current source configured to supply the fourth switching device and the sense amplifier with the bias voltage.

10. The RFID device of claim 1, wherein in the memory unit one cell including the resistive switch device is coupled to the bit line to thereby form one unit cell.

11. The RFID device of claim 10, wherein the unit cell is formed in a region where the bit line, a word line, and the cell plate line intersect.

12. The RFID device of claim 11, wherein the unit cell comprises:
a fifth switching device coupled to the bit line and controlled by the word line; and
a third resistive switch device coupled between the fifth switching device and the cell plate line.

13. The RFID device of claim 10, further comprising a sense amplifier configured to amplify a voltage difference between the voltage of the bit line and a reference voltage.

14. The RFID device of claim 10, wherein the memory unit comprises:
a second write driver configured to supply the bit line with a driving voltage in a write operation mode; and
a second clamp controller configured to supply the bit line with a constant bias voltage in a read operation mode.

15. The RFID device of claim 14, wherein the second clamp controller comprises:
a fifth switching device coupled to the bit line and controlled by a third clamp signal; and
a third current source configured to supply the fifth switching device and a sense amplifier with the bias voltage.

16. The RFID device of claim 1, wherein:
the memory unit writes first data to the resistive switch device when the bit line and a word line are at a high level and the cell plate line is at a low level, and
the memory unit writes second data to the resistive switch device when the bit line is at a low level and the word line and the cell plate line are at a high level, the first data and the second data having different logic states from each other.

17. The RFID device of claim 1, wherein the memory unit reads data when a bias voltage is applied to the bit line and a sense amplifier enable signal is activated, such that a word line is enabled and the cell plate line is at a low level.

18. The RFID device of claim 1, wherein the radio signal transceiver comprises:
a voltage multiplier configured to generate a power supply voltage in response to the radio signal;
a modulator configured to modulate a response signal applied from the digital unit;
a demodulator configured to demodulate the radio signal and generate the command signal;
a power on reset unit configured to generate a power on reset signal in response to the power supply voltage; and
a clock generator configured to generate a clock in response to the power supply voltage.

* * * * *